United States Patent
Iyer et al.

(10) Patent No.: US 10,657,025 B2
(45) Date of Patent: May 19, 2020

(54) SYSTEMS AND METHODS FOR DYNAMICALLY IDENTIFYING DATA ARGUMENTS AND INSTRUMENTING SOURCE CODE

(71) Applicant: Denso International America, Inc., Southfield, MI (US)

(72) Inventors: Gopalakrishnan Iyer, Santa Clara, CA (US); Ameer Kashani, Southfield, MI (US); Remma Takeuchi, Cupertino, CA (US)

(73) Assignee: Denso International America, Inc., Southfield, MI (US)

( * ) Notice: Subject to any disclaimer, the term of this patent is extended or adjusted under 35 U.S.C. 154(b) by 0 days.

(21) Appl. No.: 16/164,132

(22) Filed: Oct. 18, 2018

(65) Prior Publication Data
US 2020/0125475 A1  Apr. 23, 2020

(51) Int. Cl.
*G06F 11/36* (2006.01)
*G06F 8/41* (2018.01)
*G06F 8/75* (2018.01)

(52) U.S. Cl.
CPC .......... *G06F 11/3612* (2013.01); *G06F 8/433* (2013.01); *G06F 8/75* (2013.01); *G06F 11/3664* (2013.01)

(58) Field of Classification Search
None
See application file for complete search history.

(56) References Cited

U.S. PATENT DOCUMENTS

| 7,577,992 | B2 | 8/2009 | Abadi et al. |
| 8,613,080 | B2 | 12/2013 | Wysopal et al. |
| 8,875,288 | B2 | 10/2014 | Leake et al. |
| 9,390,261 | B2 | 7/2016 | Costa et al. |

(Continued)

FOREIGN PATENT DOCUMENTS

EP  1870829 A1  12/2007

OTHER PUBLICATIONS

Diez-Franco, I. et al., Data is Flowing in the Wind: A Review of Data-Flow Integrity Methods to Overcome Non-Control-Data Attacks, In Complex, Intelligent, and Software Intensive Systems, 2016 (http://paginaspersonales.deusto.es/isantos/papers/2016/2016-diezfranco-cisis16-data-is-flowing-in-the-wind.pdf).

(Continued)

*Primary Examiner* — Daxin Wu
(74) *Attorney, Agent, or Firm* — Christopher G. Darrow; Darrow Mustafa PC

(57) ABSTRACT

System, methods, and other embodiments described herein relate to validating data arguments in a program. In one embodiment, a method includes, in response to an electronic request, identifying a data argument within a code segment of source code of the program. The data argument is non-control data passed between one or more functions of the program. The method includes storing data characteristics about the data argument within a control flow graph derived from the source code. The control flow graph represents execution paths within the program. The data characteristics indicate a state of the data argument and at least one relationship associated with the data argument. The method includes providing the control flow graph as an electronic output to facilitate adjustments in the source code.

20 Claims, 10 Drawing Sheets

(56) References Cited

U.S. PATENT DOCUMENTS

| | | | |
|---|---|---|---|
| 9,400,889 B2 | 7/2016 | Chess et al. | |
| 9,729,569 B2 | 8/2017 | Teilhet et al. | |
| 2004/0111713 A1* | 6/2004 | Rioux | G06F 8/427 717/137 |
| 2009/0282393 A1* | 11/2009 | Costa | G06F 21/52 717/132 |
| 2009/0328185 A1 | 12/2009 | Van den Berg et al. | |
| 2010/0023810 A1* | 1/2010 | Stolfo | G06F 11/3652 714/38.11 |
| 2010/0153785 A1* | 6/2010 | Keromytis | G06F 11/08 714/38.11 |
| 2013/0326625 A1* | 12/2013 | Anderson | G06F 21/56 726/23 |
| 2015/0356294 A1* | 12/2015 | Tan | G06F 8/427 726/22 |
| 2017/0124322 A1* | 5/2017 | Guilley | G06F 8/75 |
| 2017/0316212 A1 | 11/2017 | Tripp | |

OTHER PUBLICATIONS

Ramezanifarkhan, T. et al., Principles of Data Flow Integrity: Specification and Enforcement, Journal of Information Science and Engineering 31, pp. 529-546, 2015.

Carlini, N. et al., Control-Flow Bending: On the Effectiveness of Control-Flow Integrity, In Proceedings of the 24th USENIX Security Symposium, 2015. (https://www.usenix.org/system/files/conference/usenixsecurity15/sec15-paper-carlini.pdf).

Demay et al., "SIDAN: A tool dedicated to software instrumentation for detecting attacks on non-control-data", Risks and Security of Internet and Systems(CRISIS), 2009 Fourth International Conference ON, IEEE, Oct. 10, 2009, pp. 51-58.

\* cited by examiner

```
Source Code 200

...
Printf(char *var){
While (var[i] != 'x\00'):
Putc(var[i]; i++;
}
...

#include <stdio.h>
Int main()[
Printf("Hello");
return 0;
]
```

FIG. 2

SYSTEMS AND METHODS FOR DYNAMICALLY IDENTIFYING DATA ARGUMENTS AND INSTRUMENTING SOURCE CODE

TECHNICAL FIELD

The subject matter described herein relates in general to systems and methods for dynamically extracting data arguments of a program, and, in particular, to dynamically identifying the non-control data arguments simultaneously with control data arguments from which a control flow graph is produced to facilitate automatic instrumentation of the program.

BACKGROUND

Securing a software program against malicious attacks can represent a significant difficulty. For example, the program can include different vulnerabilities in relation to different data types and ways in which those data types may be implemented. Malicious attackers may exploit these vulnerabilities to manipulate data values. This malicious manipulation can result in unintended actions by the program such as runtime errors, data destruction, data exposure, and so on. In general, the attacks focus on exploiting buffer overflows or other vulnerabilities associated with control data and/or non-control data to modify a return address, a function pointer, or some other security sensitive data.

Moreover, ensuring that a program conforms to desired standards in relation to formatting, security, and other standards to prevent these malicious attacks can be a significant difficulty especially when a program is relatively robust and/or complex. In general, developers may reference control flow graphs and/or other tools in attempts to optimize a program and/or to better understand relationships between different functions/segments within the program. However, present approaches produce large complex graphs that can be impractical for a developer to interpret and are not generally available in a timely manner so as to be useful when originally generating the program.

Similarly, adding instrumentation into the source code of the program to provide security against the malicious attacks can further complicate development. For example, additional source code embodied as the instrumentation may be inaccurately coded or may be unintentionally left out considering the many varied segments of instrumentation that are generally to be included within the program and subsequently verified. Consequently, securing the program flow and/or non-control data arguments may suffer from inadequate instrumentation leading to further difficulties such as security holes, which open the program to further malicious attacks.

SUMMARY

In one embodiment, example systems and methods associated with dynamically validating data arguments are disclosed. As previously noted, current approaches to identifying and instrumenting data arguments in source code are generally inadequate because the approaches suffer from issues with complexity and timely availability of information.

Therefore, in one embodiment, a data control system that generates control flow graphs of a program in real-time including information about non-control data arguments is disclosed. Moreover, the data control system, in one embodiment, uses the control flow graph to provide additional functionality such as automatically instrumenting source code of the program to ensure data flow integrity and program flow integrity. In one approach, the disclosed data control system monitors an integrated development environment for code segments as the code segments are added to the source code that will subsequently be compiled into the program. The flow control system identifies data characteristics of data arguments along with, for example, control flow characteristics of the code segments in response to detecting the addition of the segments.

In general, data characteristics include aspects relating to a state of the associated data argument such as when the data argument is instantiated, used, modified and so on. Moreover, the data characteristics may also include relationships associated with the data argument such as functions to which the data argument is passed, which functions may modify the data argument, and so on.

Additionally, the control flow characteristics include, for example, aspects that influence intra-procedural and/or inter-procedural control flow of the program (e.g., control data) such as function calls, return addresses, stack pointers, and so on. With knowledge of the control flow characteristics and the data characteristics, the system can dynamically generate/update sections of a control flow graph to represent the program flow while also integrating the data characteristics describing the non-control data of the program. For example, as additional code segments are integrated into the source code, the data control system generates nodes, directed edges, and tags/makers within the nodes that relate to various aspects of the newly integrated code segments. In one approach, the data control system dynamically updates the control flow graph in real-time such that as the source code is being modified (e.g., added to, amended, etc.), the system is also adding new segments into the control flow graph and/or modifying existing segments to further represent both control data and non-control data.

Consequently, the control flow graph embodies various critical aspects of the program within a single refined data structure. As such, the data control system, in one embodiment, provides the control flow graph to further modules/systems to facilitate additional functionality. For example, in one embodiment, the data control system uses the control flow graph as a mechanism to automatically instrument the source code. The data control system identifies both control aspects and non-control aspects within the graph that, for example, should include instrumentation to facilitate securing the program flow and data arguments. As such, the system integrates the instrumentation in real-time so that the instrumentation is automatically included along with particular aspects of the source code. In this way, the data control system improves the development and ultimate functioning of the program through better ensuring program flow and data integrity.

In one embodiment, a data control system for validating data arguments in a program is disclosed. The data control system includes one or more processors and a memory that is communicably coupled to the one or more processors. The memory stores an analysis module including instructions that when executed by the one or more processors cause the one or more processors to, in response to an electronic request, identify a data argument within a code segment of source code of the program. The data argument is non-control data passed between one or more functions of the program. The memory stores a graph module including instructions that when executed by the one or more processors cause the one or more processors to store data characteristics about the data argument within a control flow graph derived from the source code. The control flow graph represents execution paths within the program. The data characteristics indicate a state of the data argument and at least one relationship associated with the data argument. The graph module includes instructions to provide the control flow graph as an electronic output to facilitate adjustments in the source code.

In one embodiment, a non-transitory computer-readable medium is disclosed. The computer-readable medium stores instructions that when executed by one or more processors cause the one or more processors to perform the disclosed functions. The instructions include instructions to, in response to an electronic request, identify a data argument within a code segment of source code of the program. The data argument is non-control data passed between one or more functions of the program. The instructions include instructions to store data characteristics about the data argument within a control flow graph derived from the source code. The control flow graph represents execution paths within the program. The data characteristics indicate a state of the data argument and at least one relationship associated with the data argument. The instructions include instructions to provide the control flow graph as an electronic output to facilitate adjustments in the source code.

In one embodiment, a method of validating data arguments in a program is disclosed. The method includes, in response to an electronic request, identifying a data argument within a code segment of source code of the program. The data argument is non-control data passed between one or more functions of the program. The method includes storing data characteristics about the data argument within a control flow graph derived from the source code. The control flow graph represents execution paths within the program. The data characteristics indicate a state of the data argument and at least one relationship associated with the data argument. The method includes providing the control flow graph as an electronic output to facilitate adjustments in the source code.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 2 illustrates one example of source code of a program.

DETAILED DESCRIPTION

Figure 1:
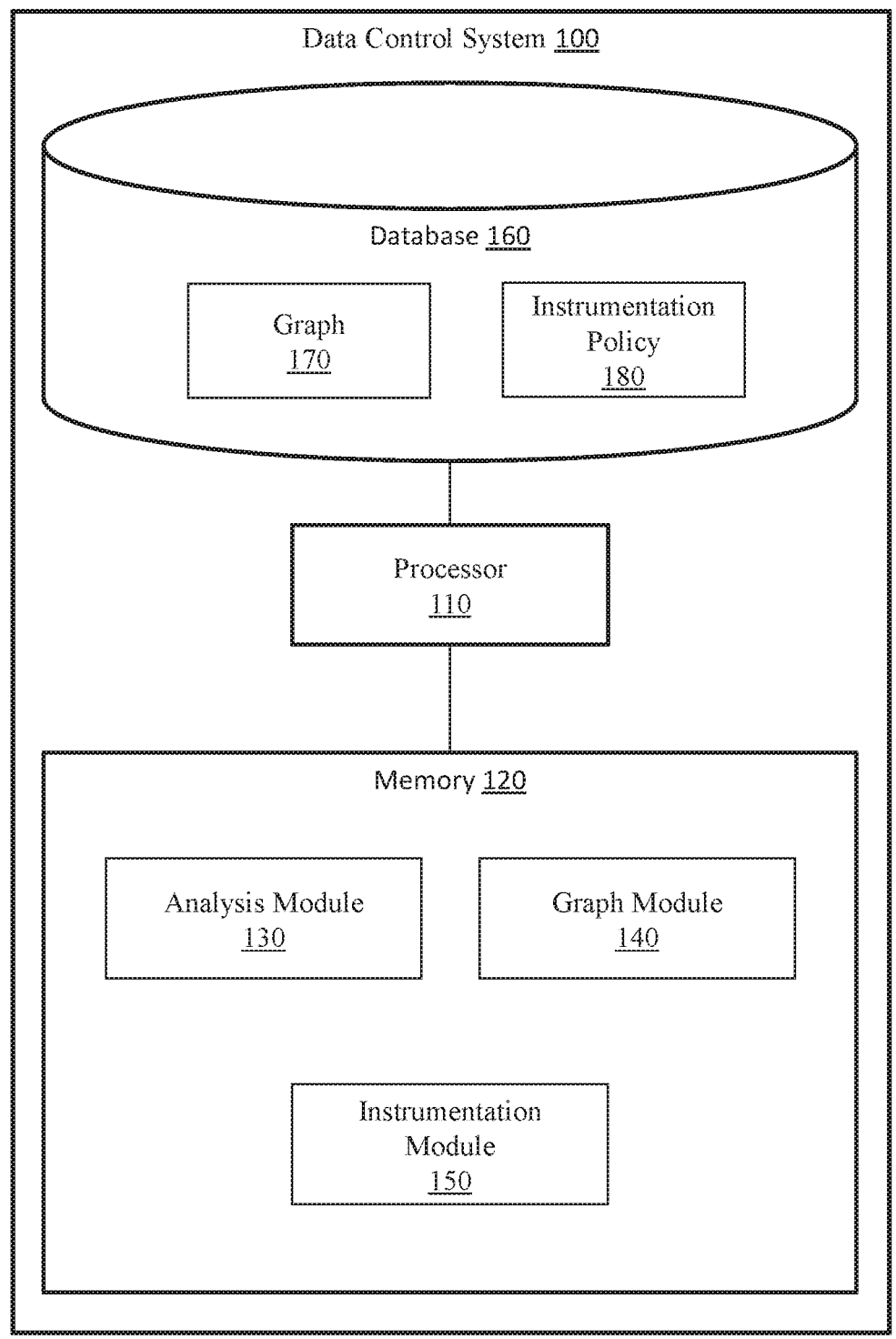
FIG. 1 illustrates one embodiment of a data control system that is associated with generating control flow graphs and performing other functions in relation to source code of a program.

Systems, methods and other embodiments associated with dynamically validating data arguments are disclosed. As previously noted, current approaches to identifying and instrumenting data arguments in source code are generally inadequate because the approaches suffer from issues with complexity and timely availability of information. Thus, the resulting program can suffer from inadequately protected data flow.

Therefore, in one embodiment, a data control system that generates control flow graphs of a program in real-time is disclosed. Moreover, the data control system, in one embodiment, uses the control flow graph to provide additional functionality such as instrumenting source code automatically through policies defined in relation to both control and non-control data arguments embodied within the control flow graph. Accordingly, providing for the automatic instrumentation of the program can facilitate ensuring proper execution (e.g., program flow and data integrity) of the program.

In one approach, the disclosed data control system monitors an electronic data stream within, for example, an integrated development environment for code segments. As the data control system detects the code segments or modifications to existing code segments, the data control system, for example, analyzes the code segments and how the code segments are integrated with existing source code, if any, to identify characteristics of the code segments (i.e., aspects identifying various data arguments).

In general, the characteristics include, for example, at least non-control data arguments but may also include control flow arguments. The control flow aspects influence intra-procedural and/or inter-procedural control flow of the program such as function calls, return addresses, and so on while the non-control aspects relate to use of variables (e.g., modifications of memory locations that do not influence program execution paths). With knowledge of the various characteristics, the system can dynamically generate/update sections of a control flow graph in relation to both program flow and data arguments that are accessed, changed, and initiated at various points in the program.

For example, as additional code segments are integrated into the source code, the data control system generates/modifies nodes, directed edges, states for data arguments, and other aspects of the control flow graph that relate to the newly integrated code segments. In one aspect, the data control system dynamically updates the control flow graph in real-time such that as the source code is being modified (e.g., added to, amended, etc.), the system is also adding new segments into the control flow graph and/or modifying existing segments. It should be appreciated that while the data control system is discussed as operating in real-time as the source code is developed, the data control system may also function to process the source code as a whole once completed, intermittently, upon request, and so on.

Therefore, the data control system can use the generated control flow graph, which embodies many aspects of the underlying source code, for improving the program. That is, in one embodiment, the data control system uses the control flow graph to generate a visual representation of the execution flow of the program along with states of the data arguments at various stages of the execution. In other words, the data control system, in one approach, electronically displays the visual representation of the control flow graph within an integrated development environment (IDE) with real-time updates as a manner of informing a developer about the program while the program is being developed. Thus, providing the control flow graph in real-time facilitates ensuring the appropriate programmatic structure of the program in relation to both control flow data arguments and non-control data arguments. In this way, the data control system improves the functionality of the program by facilitating better awareness of important aspects of the program during development.

Additionally, the data control system uses the control flow graph as a mechanism to automatically instrument the source code. The data control system identifies aspects within the graph that, for example, are associated with segments of the source code that should include instrumentation to ensure the program flow integrity and data integrity. Because the control flow graph stores data characteristics and control flow characteristics that, for example, intrinsically identify key aspects of the source code, the data control system leverages this attribute to improve how the source code is instrumented with runtime checks.

As such, the data control system integrates the instrumentation so that the instrumentation is automatically included along with particular aspects of the source code and also, in one approach, in real-time so that a developer can validate the instrumentation on-the-fly while developing the program and without explicitly remembering to include the instrumentation. In this way, the data control system improves data integrity and program flow integrity.

Referring to FIG. 1, one embodiment of a data control system 100 is illustrated. While arrangements will be described herein with respect to the data control system 100, it will be understood that embodiments are not limited to a unitary system as illustrated. In some implementations, the data control system 100 may be embodied as a cloud-computing system, a cluster-computing system, a distributed computing system, a software-as-a-service (SaaS) system, and so on. Accordingly, the data control system 100 is illustrated and discussed as a single device for purposes of discussion but should not be interpreted as limiting the overall possible configurations in which the disclosed components may be configured. For example, the separate modules, memories, databases, and so on may be distributed among various computing systems in varying combinations.

The data control system 100 also includes various elements. It will be understood that in various embodiments it may not be necessary for the data control system 100 to have all of the elements shown in FIG. 1. The data control system 100 can have any combination of the various elements shown in FIG. 1. Further, the data control system 100 can have additional elements to those shown in FIG. 1. In some arrangements, the data control system 100 may be implemented without one or more of the elements shown in FIG. 1. Further, while the various elements are shown as being located within the data control system 100 in FIG. 1, it will be understood that one or more of these elements can be located external to the data control system 100. Further, the elements shown may be physically separated by large distances.

Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the data control system 100 is implemented to perform methods and other functions as disclosed herein relating to improving data integrity of a program. The noted functions and methods will become more apparent with a further discussion of the figures. Furthermore, the data control system 100 is shown as including a processor 110. Thus, in various implementations, the processor 110 may be a part of the data control system 100, the data control system 100 may access the processor 110 through a data bus or another communication pathway, the processor 110 may be a remote computing resource accessible by the data control system 100, and so on. In either case, the processor 110 is an electronic device such as a microprocessor, an ASIC, or another computing component that is capable of executing machine-readable instructions to produce various electronic outputs therefrom that may be used to control or cause the control of other electronic devices.

In one embodiment, the data control system 100 includes a memory 120 that stores an analysis module 130, a graph module 140, and an instrumentation module 150. The memory 120 is a random-access memory (RAM), read-only memory (ROM), a hard-disk drive, a flash memory, or other suitable memory for storing the modules 130, 140, and 150. The modules 130, 140, and 150 are, for example, computer-readable instructions that when executed by the processor 110 cause the processor 110 to perform the various functions disclosed herein. In various embodiments, the modules 130, 140, and 150 can be implemented in different forms that can include but are not limited to hardware logic, an ASIC, components of the processor 110, instructions embedded within an electronic memory, and so on.

With continued reference to the data control system 100, in one embodiment, the system 100 includes a database 160. The database 160 is, in one embodiment, an electronic data structure stored in the memory 120, a distributed memory, a cloud-based memory, or another data store and that is configured with routines that can be executed by the processor 110 for analyzing stored data, providing stored data, organizing stored data, and so on. Thus, in one embodiment, the database 160 stores data used by the modules 130, 140, and 150 in executing various determinations. In one embodiment, the database 160 stores a control flow graph 170. In further embodiments, the data control system 100 stores the graph 170 in the memory 120, a specialized data structure, a cache memory of the processor 110, or another suitable data storage component.

As used herein, program refers to compiled machine code that is derived from source code. Thus, the program is, in one embodiment, a compiled program or portion thereof that is machine code. The phrase "machine code" as used herein generally refers to a program that is represented in machine language instructions that can be, for example, executed by a microprocessor such as the processor 110. Moreover, the machine code is generally understood to be a primitive or hardware-dependent language that is comprised of opcodes defined by an instruction set implemented by associated hardware. Furthermore, the machine code itself is further comprised of data values, register addresses, memory addresses, and so on. Of course, while the program is discussed as being machine code, in further embodiments, the program is assembly code or another intermediate representation derived from the source code.

The source code from which the program is compiled is comprised of, for example, functions, data structures, objects, statements, and so on. Instrumentation that is included as part of the source code is further comprised of the same elements (e.g., objects, statements, etc.). In general, the program is organized as a set of functions. In various renditions, the functions may be nested within one another as sub-functions. Moreover, the functions are generally comprised of a set of statements (e.g., loops, I/O statements, etc.) and are typically focused on a particular functionality. That is, each separate function is generally implemented to perform a particular task. Thus, sub-functions may implement sub-routines in support of a broader functionality of a parent function. In either case, the functions include source code that defines the statements forming the function itself and provide for implementing the functionality associated with the function.

Furthermore, as discussed herein, the noted modules 130, 140, and 150 may function as plugins into an integrated development environment or as standalone functionality. The integrated development environment (IDE) is a program or collection of programs that provide facilities for the development of software. For example, an IDE can include a source code editor, build tools, debuggers, compilers, interpreters, a graphical user interface (GUI), and so on. In general, IDEs are a mechanism for improving the efficiency of developers (i.e., programmers) through providing an overall environment with tools and other aspects that facilitate the creation of programs. Thus, as noted, in one or more arrangements, the modules 130, 140, and 150 are plugins that integrate with the IDE to provide additional functionality. Accordingly, in one approach, the modules 130, 140, and 150 access electronic data of the IDE including electronic input and output streams including, for example, code segments provided electronically into the IDE. The modules 130, 140, and 150 may leverage an application program interface (API) of the IDE to facilitate the access. Moreover, such access may be provided in the form of application hooks that automate (e.g., provide direct integral access) the integration of the modules 130, 140, and 150. In either case, the system 100 and the modules 130, 140, and 150 generally function cooperatively with the IDE. Thus, the IDE, in execution, generally manages the source code from which the program is compiled and may also provide for actually compiling the source code into the program.

Continuing with elements of the database 160, the graph 170 is a control flow graph that represents execution paths through the program. Moreover, the graph 170 further represents data arguments and associated states of the data arguments at different nodes in the graph 170. In one embodiment, the analysis module 130 and the graph module 140 function together to derive the graph 170 from source code as the source code is dynamically provided into the IDE. In alternative embodiments, the analysis module 130 and the graph module 140 operate to perform the noted functions in response to a specific request, intermittently, or prior to the source code being compiled.

The graph module 140 forms the graph 170 using, in one approach, nodes, and directed edges between the nodes. The nodes represent blocks of the source code while the directed edges between the nodes represent transitions between the blocks. The blocks are atomic segments of code (e.g., uninterrupted) or at least integrally related segments of the source code. The directed edges, in one embodiment, indicate intra-procedural and/or inter-procedural control flow transfers between the blocks/segments. That is, the edges represent handovers, function calls, function arguments, and so on. In general, the directed edges illustrate transfers in the execution of the program between the separate blocks.

Additionally, in one embodiment, the graph module 140 uses data characteristics about non-control data arguments to annotate the control flow graph 170. For example, the graph module 140 produces the graph 170 to include annotations about data arguments within the source code. The data arguments are non-control data arguments such as variables passed between functions. By contrast, the control flow characteristics used by the graph module 140 to generate the nodes and directed edges represent control flow data arguments that affect execution paths of the program. In either case, the graph module 140 annotates the nodes and/or directed edges to include the data characteristics that identify at least an associated state for the data arguments in relation to the node/edge. In this way, the graph module 140 produces the graph 170 to have a more comprehensive representation of potentially vulnerable aspects of the program that could be susceptible to malicious attacks.

It should be appreciated that in separate embodiments the nodes and directed edges may be defined differently than set forth herein. For example, in one approach, the segments/blocks that comprise the nodes and conditions that define the directed edges are specified according to a graph policy. The graph policy defines templates, example segments/conditions, and/or metrics for identifying the blocks/segments and transitions that form the nodes and edges, respectively. Thus, the system 100 can be implemented to flexibly define aspects of the graph 170 according to separate implementations. Similarly, the system 100 can define the data characteristics that define the non-control data arguments within the graph policy to vary according to a particular implementation.

Figure 3:
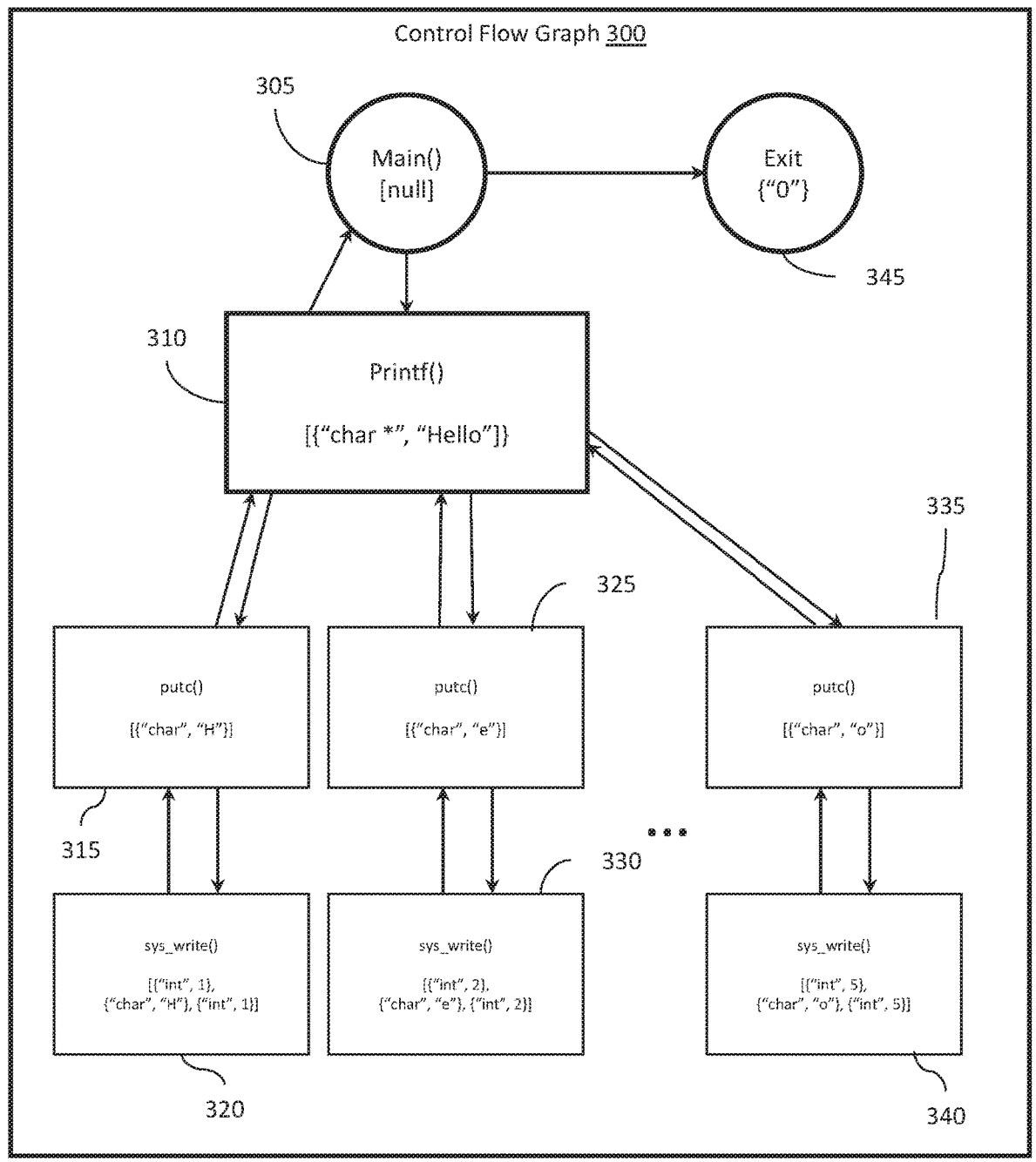
FIG. 3 illustrates one example of a control flow graph that the system of FIG. 1 derives from the source code of FIG. 2.

By way of example, FIG. 2 illustrates a sample segment of the source code of a program. Additionally, FIG. 3 illustrates an example control flow graph 300. The control flow graph 300 is an illustrative example of a graph as may be generated by the graph module 140 from inputs provided via the analysis module 130. Accordingly, the graph 300 includes nodes 305, 310, 315, 320, 325, 330, 335, 340, and 345 that correspond with segments/blocks of code from the source code 200. The graph 300 further illustrates directed edges between the nodes that correspond with relationships between the segments of the source code 200. In further aspects, while not explicitly illustrated in the graph 300, the graph module 140 includes the data characteristics of non-control data arguments within the graph 300. For example, the analysis module 130 may identify the string char as a non-control data argument. Thus, the data characteristics of the string char may indicate modifications by one or more functions such as Printf and Putc while also indicating where/when the string can be initialized as additional annotations with the graph 170.

Moreover, the separate nodes and directed edges are, for example, defined according to control flow characteristics of the source code. That is, the ways in which the blocks/segments of the source code inter-relate and delineations between the blocks/segments themselves are defined according to control flow characteristics of the source code. As will be discussed further subsequently, the graph module 140 generally identifies the control flow characteristics and the data characteristics from the source code of the program and may do so according to a graph policy defined within the system 100.

Figure 4:
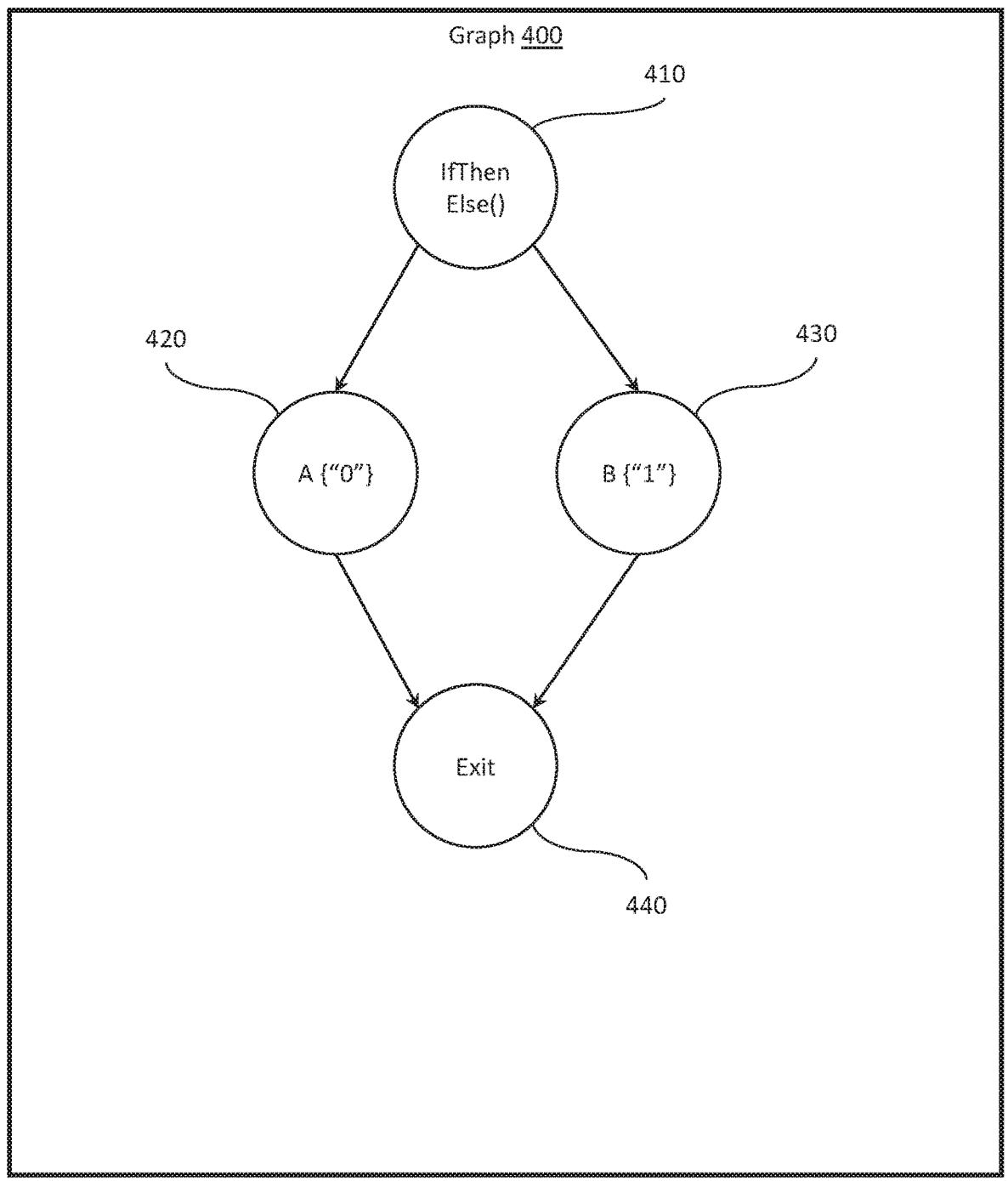
FIG. 4 illustrates a further example of a control flow graph.
Figure 5:
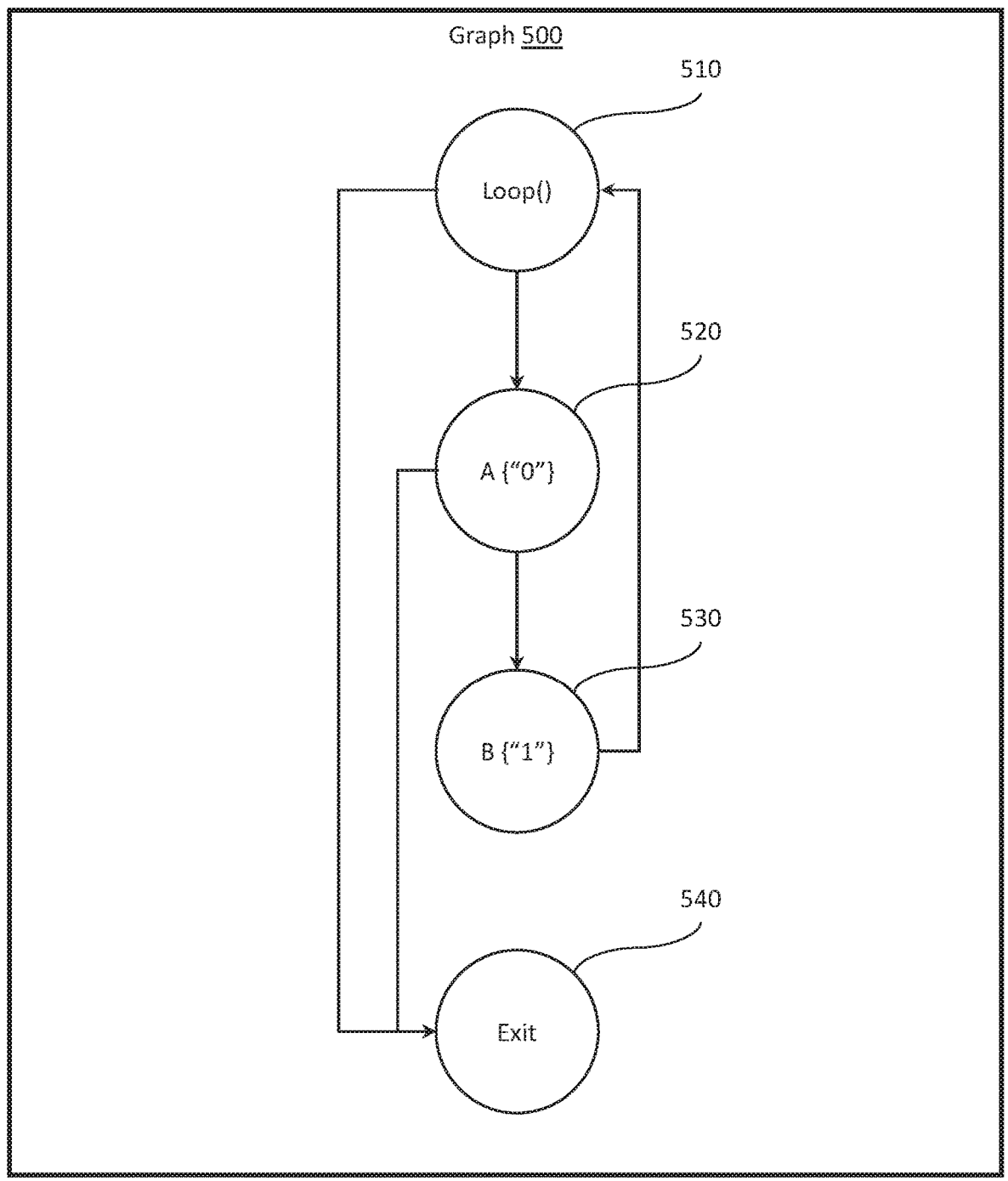
FIG. 5 illustrates an additional example of a control flow graph.

In either case, FIGS. 4 and 5 illustrate further examples of control flow graphs 400 and 500 that correspond with different segments of source code. For example, as illustrated in FIG. 4, the graph 400 includes four separate nodes 410, 420, 430, and 440 that correspond with separate segments of source code correlating with separate paths through an if-then-else statement as indicated by the corresponding directed edges. Moreover, FIG. 5 illustrates the graph 500 including nodes 510, 520, 530, and 540 that represent segments of code within an associated block/function. As illustrated, the graph 500 represents a loop that includes two separate exit conditions as illustrated by the separate directed edges leading to the exit node 540. Thus, the graph 170 can depict many different configurations of source code in order to represent an execution flow of a program.

Moreover, it should be appreciated that the provided examples relate to relatively short code segments, and, as a general tendency, the graph 170 includes a plurality of nodes and directed edges therebetween. As one example, the "exit" nodes as illustrated in the example graphs 400 and 500, in various implementations, generally indicate transitions to separate code segments instead of actual program exits. Moreover, the graphs 400 and 500 are not illustrated along with non-control data arguments, but it should be appreciated that the separate nodes with the graphs 400 and 500 can be annotated to further specify aspects of related non-control data arguments. As such, the graph 170 facilitates better understanding by developers when rendered in a visual format and also provides for facilitating further automated functions through providing an understanding of the program flow and data characteristics to various modules.

Figure 6:
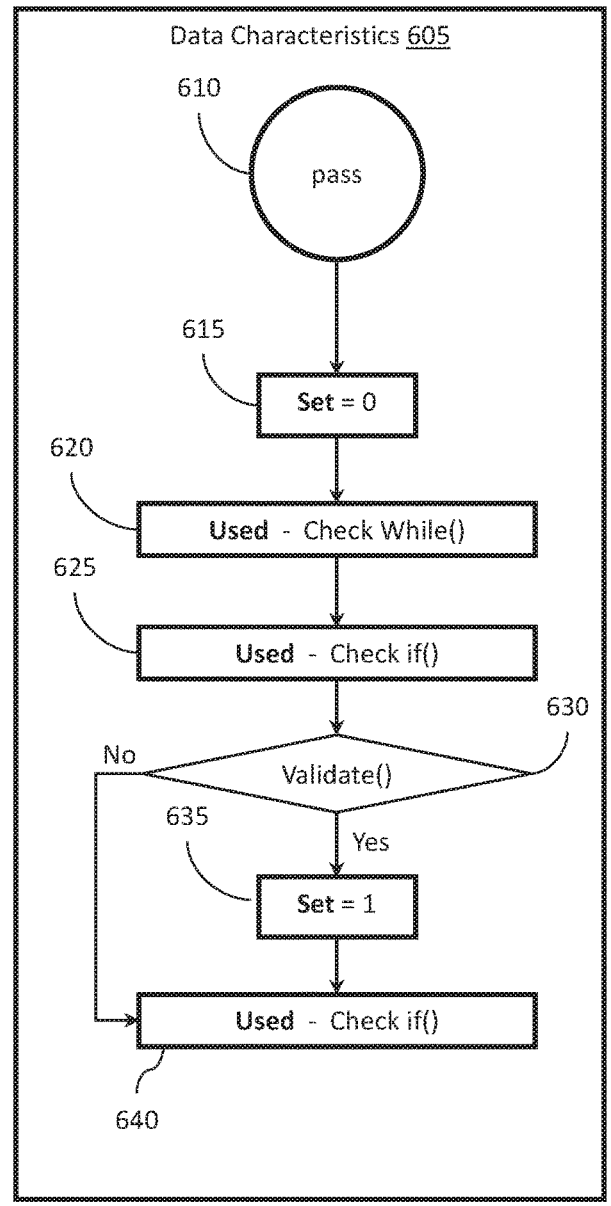
FIG. 6 illustrates an example of source code and data characteristics for a data argument derived therefrom.

As a further example of how the analysis module 130 and the graph module 140 extract information about non-control data arguments for inclusion in the graph 170, consider FIG. 6. FIG. 6 illustrates a sample section of source code 600 along with data characteristics 605 as may be extracted from the source 600 by the analysis module 130. As illustrated in FIG. 6, the data characteristics 605 include annotations for data argument of the integer "pass" at various stages during execution of the source code 600. That is, the data characteristics 605 illustrate states of the pass data argument involving instantiation and setting of the data argument at 610, and 615, use of the data argument at 620, and 625, a conditional entry to set the data argument at 630, and 635, and lastly a further use of the data argument within an if statement at 640. Accordingly, the data characteristics 605 indicate when and by which aspects of the program access to the data argument is appropriate/permissible. As such, the graph module 140 can store the data characteristics within the graph 170 in order to provide further details about the source code.

As a further note, the data argument is generally a variable as described within the source code and can be of various types such as a string, integer, character, and so on. Furthermore, while the source code can include a plurality of such non-control data arguments, the analysis module 130, in one approach, selectively identifies data characteristics for particular data arguments according to conditions indicated by the graph policy. Thus, the inclusion of a data argument within the graph 170 may be contingent on the analysis module 130 determining that the data argument satisfies conditions for inclusion. While the conditions may vary according to implementation, in general, the graph policy indicates data arguments that may be exposed to manipulation or are more sensitive (e.g., passwords) as data arguments that are to be included.

Figure 7:
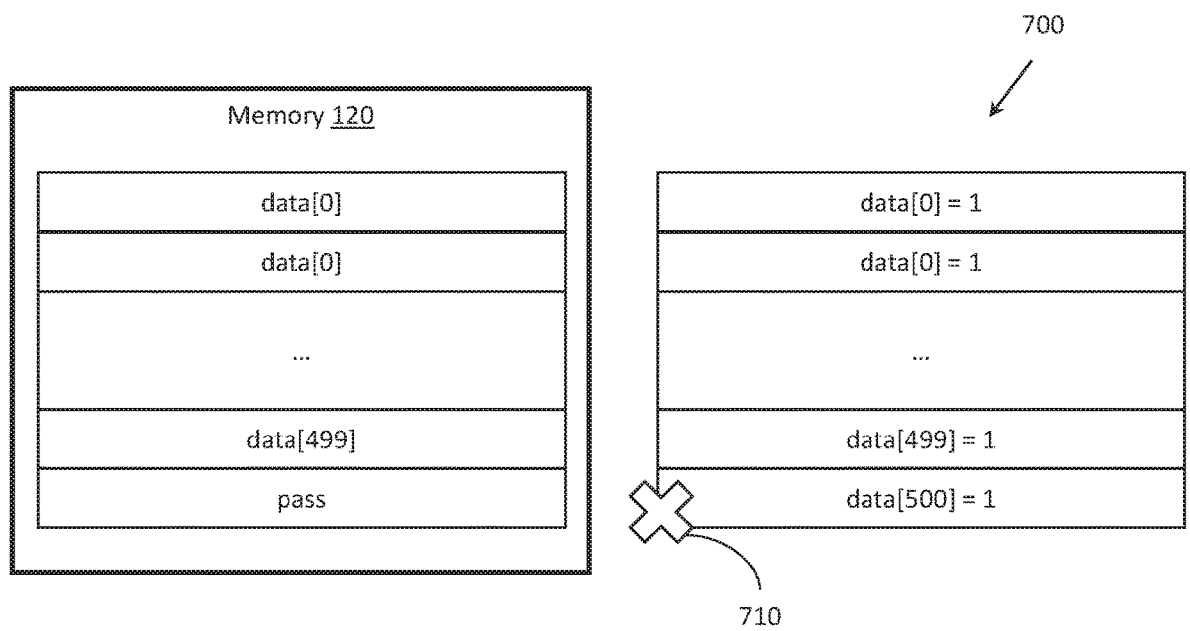
FIG. 7 illustrates one example of manipulation of a data argument in memory.

FIG. 7 illustrates one example of how the data argument from FIG. 6 may be maliciously manipulated. For example, FIG. 7 illustrates the string "data" and the integer "pass" from the source code 600 as stored within the memory 120. Thus, the integer pass occurs at a memory address directly following the string data. Accordingly, as shown in the modification view 700 of the memory 120, values of the string char are adjusted as the source code 600 executes for the 500 locations within the string 0 to 499. However, malicious manipulation of the string, as shown at 710, attempts to extend beyond the string data and overwrite the integer pass. This type of malicious attack on a data argument such as the integer pass is what can be prevented through inclusion of instrumentation that provides runtime checks for the data argument.

Continuing with the database 160 of FIG. 1, the instrumentation policy 180 defines various conditions and/or segments of source code for which the instrumentation module 150 includes instrumentation within the source code as will be discussed in greater detail subsequently. In general, the instrumentation can serve different purposes depending on a particular implementation. For example, the instrumentation can be integrated within a function to provide for controlling program flow (e.g., ensuring the program isn't misdirected), for debugging, for verifying data arguments (e.g., preventing manipulation of data values), for verifying I/O, and so on. For example, in an instance where the program controls an advanced driving assistance system (ADAS) to automatically adjust how a vehicle is controlled on the road, the instrumentation may include security instrumentation to prevent malicious manipulation of the program flow and/or data values that could result in an accident and injury to passengers if the program is manipulated through a malicious attack.

In further aspects, the instrumentation policy 180 also defines instrumentation thresholds or at least metrics for generating the instrumentation thresholds. In one approach, the instrumentation policy 180 defines instrumentation thresholds for different classes of functions, data arguments, and so on. For example, the instrumentation policy 180, in one embodiment, defines classes for functions/arguments according to a security level as may be tagged by a developer or derived according to defined metrics associated with code segments. Thus, the instrumentation policy 180 can indicate a first threshold for a first class, a second threshold for a second class, a third threshold for a third class and so on. In general, the separate classes and associated thresholds for security levels may relate to a vulnerability of a particular function/argument (e.g., exposure to manipulation) or to other aspects. Thus, the instrumentation policy 180 may indicate different thresholds at which segments are to be instrumented in order to optimize inclusion of the instrumentation. Thus, in practice, the instrumentation module 150, for example, assesses the code segments and automatically includes the instrumentation according to the assessment when the noted thresholds are satisfied.

Moreover, the actual instrumentation itself that is included within the code segments is defined, in one embodiment, as templates within the aforementioned graph policy. For example, the templates define a set of standardized instrumentation that performs various functions in relation to controlling program flow, verifying I/O, providing additional functional hooks, providing data integrity to data arguments, and so on. Moreover, the templates, in one approach, further indicate variables that are, for example, customized by the instrumentation module 150 according to a particular code segment with which the instrumentation is included. That is, the instrumentation module 150, in one example, may include instrumentation to verify a return address of a function or control access to a variable. Thus, the instrumentation module 150 modifies variables of an associated instrumentation statement from the template to correspond with the associated source code and provide security or other functionality for the associated source code segment by using the template as a base. Further aspects of the instrumentation policy 180 and the instrumentation module 150 will be discussed subsequently.

Continuing with FIG. 1, the analysis module 130, in one embodiment, includes computer-readable instructions that when executed by the processor 110, cause the processor to detect a code segment as the code segment is being added to the source code. In one approach, the analysis module 130 accesses the IDE internally through an application program interface (API) or other program hook to access an electronic input stream within the IDE. The electronic input stream generally includes any electronic inputs provided into the IDE through other system components of an associated computing device. For example, the analysis module 130 monitors electronic inputs from other processes executing on the processor 110, electronic communications received via a network communication interface, intra-process (i.e., within the IDE) communications, I/O inputs from machine interface devices connected with the computing device (e.g., keyboard), and so on.

Accordingly, the analysis module 130, in one approach, monitors the noted electronic inputs for additions, and/or modifications to the source code of the program. That is, the analysis module 130 monitors a stream of inputs into the IDE for new code segments, inputs modifying existing code segments, and so on.

Moreover, the analysis module 130, in one embodiment, also includes instructions to analyze the source code to identify control flow characteristics and data characteristics of the source code. That is, as changes are made within the source code, the analysis module 130 actively detects the changes in real-time as the changes are occurring, and analyzes the changes in relation to the source code overall to identify control flow/data characteristics associated therewith. In one embodiment, the control flow characteristics include intra-procedural and/or inter-procedural control flow transfers of the program such as function calls, and return address along with symbolic names, function arguments and return values, along with a calling convention, and so on. More generally, the control flow characteristics relate to aspects that influence execution of the program resulting in handovers, exits, transitions, etc.

Furthermore, the data characteristics generally include current states of a data argument at different points in the source code, relationships associated with the data argument (e.g., functions to which the variable is passed and/or that can manipulate the variable), and so on. More generally, the data characteristics identify variables and permitted uses/accesses of the variables. Thus, the analysis module 130, in one embodiment, undertakes the noted monitoring and analysis in real-time in order to identify the control flow/data characteristics so that the graph module 140 can maintain the graph 170 in an updated form in relation to various aspects of the source code.

Accordingly, the graph module 140 includes, in one embodiment, computer-readable instructions that when executed by the processor 110, cause the processor 110 to generate/update the control flow graph 170 according to the control flow/data characteristics. It should be noted that the graph module 140, in general, generates the graph 170 as an electronic data structure that includes programmatic elements for representing the nodes and directed edges along with annotations/tags about the non-control data arguments. Initially, the graph module 140 generates the graph 170 including null values or just an entry node from which the graph module 140 builds the graph 170 through the noted updates as the source code is developed.

Thus, the graph module 140 updates the graph 170 in real-time as adjustments/modifications are made to the graph 170. Alternatively, as previously noted, the graph module 140 may generate the graph 170 upon receiving an electronic request that is, for example, intermittent, upon completion of the source code, prior to compiling the source code, and so on. Accordingly, the graph module 140, in one embodiment, actively uses the control flow characteristics to modify aspects of the source code. Thus, the graph module 140 develops the graph 170, in one embodiment, in a piecewise manner as the modifications/additions occur in order to provide a real-time assessment of the program defined by the source code. Additionally, the graph module 140 also uses the data characteristics, which are generally provided in parallel with the control flow characteristics from the analysis module 130, to further include information about the non-control data arguments in the control flow graph 170.

As a further aspect, the graph module 140, in one embodiment, further includes instructions to electronically provide the control flow graph 170 to facilitate adjustments in the source code such as inclusion of instrumentation. In one aspect, the graph module 140 actively develops the graph 170 through the inclusion of changes/additions in real-time as the changes/additions occur. The graph 170 represents possible execution paths and associated conditions such as data arguments through the program as the program is executed. Accordingly, the graph 170 provides insights into potential errors within the source code (e.g., infinite loops, exposed functions, unsecured data, etc.) that can be leveraged by various modules and systems to improve the source code in order to avoid difficulties (e.g., security holes, program faults, etc.) in the program once compiled.

As such, the graph module 140, in one embodiment, provides the graph 170 by generating a visual representation of the control flow graph 170 and dynamically displaying the visual representation within the integrated development environment (IDE). Accordingly, as the code segment is generated and provided into the IDE, the analysis module 130 identifies and analyzes the code segment along with impacts on the overall source code to provide the control flow characteristics and the data characteristics. From the control flow characteristics, the graph module 140 generates the graph 170 and the visual representation as a real-time representation of the program such that effects of the modifications are visually depicted in real-time to a developer. In one or more embodiments, the visual representation is electronically displayed in a window within the IDE and including identifiers that indicate the modifications/updates to the graph 170.

Thus, by way of example, and with reference to FIGS. 2, 3 and 4, consider that the code 200 is modified to include an if-then-else statement. Accordingly, the analysis module 130 detects the modification to the source code and analyzes the modified code to generate the control flow characteristics and the data characteristics for any data arguments that may be present. The graph module 140 then generates the nodes, directed edges, and annotations for the data arguments for the newly added statement according to the control flow characteristics and the data characteristics, which are then used by the graph module 140 to modify the graph 300 to include the graph 400 at, for example, node 325. Thus, graph module 140 can further render this adjustment within the visual representation to graphically illustrate the change while adjusting the original graph to accommodate the newly added segment.

Additionally, in alternative embodiments, the graph module 140 also provides the graph 170 to further modules/components within the system 100 or systems/modules that are remote from the graph module 140. For example, in one embodiment, the data control system 100 includes an instrumentation module 150. The instrumentation module 150 includes instructions that when executed by a processor cause the processor (e.g., processor 110) to integrate instrumentation within the source code according to the control flow graph 170. For example, in one approach, the instrumentation module 150 adds instrumentation into the source code in real-time and responsive to modifications in the source code as reflected by the graph 170. Accordingly, the instrumentation module 150 can monitor for particular conditions such as changes in the graph 170, inclusion of new code segments in the source code, modifications to existing code segments, and so on, which act as electronic requests into the instrumentation module 150 through, for example, an API of the IDE or another suitable mechanism. The electronic requests induce the instrumentation module 150, in one embodiment, to include instrumentation where program flow integrity and/or data integrity is to be ensured and/or where the instrumentation is to provide separate functionality in relation to particular code segments of the source code.

As previously noted, the instrumentation policy 180 indicates various mechanisms for identifying which aspects of the source code (e.g., via metrics or other conditions for identifying locations and types of instrumentation) are to be instrumented. In various aspects, the instrumentation included by the instrumentation module 150 is to enforce runtime checks within the program by ensuring execution of the program follows the control flow graph 170 and/or ensuring the integrity of particular data arguments as identified in the graph 170. Thus, the instrumentation module 150 generally uses the knowledge of control arguments and non-control arguments conveyed via the graph 170 in order to know how to include instrumentation for enforcing the integrity of the program both in relation to program flow and data.

Moreover, the instrumentation module 150, in further aspects, also references the graph 170 to understand data flows, data usage/access, and other aspects that are instrumented within the program. In this way, the instrumentation module 150 improves the security of the program by automatically including runtime checks that enforce the program flow and data integrity. Furthermore, the instrumentation module 150, in one embodiment, includes instrumentation to perform address checks (e.g., memory addresses for data and program flow), variable/function return type checks, data-bound checks, opcode checks, match call-return pairs (non-single class), and so on.

Of course, while the instrumentation module 150 is discussed as dynamically including the instrumentation within source code in real-time, as the developer provides new code segments and adjusts existing code segments, the instrumentation module 150, in an alternative arrangement, executes over a completed or initial version of the source code to include the instrumentation. In one approach, the instrumentation module 150 automatically adds the instrumentation when initiated in parallel with a request to a request to compile the source code into the program.

In either arrangement, the instrumentation module 150 analyzes the source code and the control flow graph 170 to integrate instrumentation within the source code. In particular, the instrumentation module 150 identifies segments of the source code that are to be instrumented according to correlations between the control flow graph 170 and the source code such as procedural transitions within the source code as identified by directed edges in the graph 170 or locations where a data argument is used/modified as identified in the graph 170. Moreover, the instrumentation module 150 automatically adds the instrumentation according to the identified segments by modifying templates of defined instrumentation to customize the defined instrumentation of the templates according to the source code. In this way, defined sets of instrumentation can be, for example, pre-tested and certified in order to ensure the added instrumentation performs as desired.

In still further aspects, the instrumentation module 150 includes the instrumentation according to tagged/labeled sections of the source code. That is, for example, in one embodiment, the instrumentation module 150 monitors for an electronic input within the IDE, and, in particular, within a particular statement, function, data argument or other portion of the source code that identifies the particular statement, function, data argument or other portion as a portion of the source code that is to be instrumented. In various approaches, the electronic input tags the portion of the source code with a comment identifier or other label to indicate the basic need for instrumentation while, in further aspects, the input specifies the particular instrumentation that is to be included or at least characteristics of the instrumentation that is to be included. For example, the provided label may indicate a sensitive/high-value function or data argument that is to be instrumented, whereas in further aspects the provided label/tag may not specify characteristics of the instrumentation but simply indicates that the portion of the code should be analyzed by the instrumentation module 150 to be automatically instrumented.

In either case, the instrumentation module 150 can label/tag the portions of the source code according to the electronic inputs to further inform the subsequent generation of the instrumentation. The originating form of the electronic input can vary according to an implementation but generally includes selection of elements in the GUI of the IDE that specify characteristics of a subsequent input as providing the tag to the portion of the source code. For example, one or more attribute selections may be activated within the GUI after which a portion of the source code that is selected is tagged with the attributes automatically by the instrumentation module 150.

Figure 8:
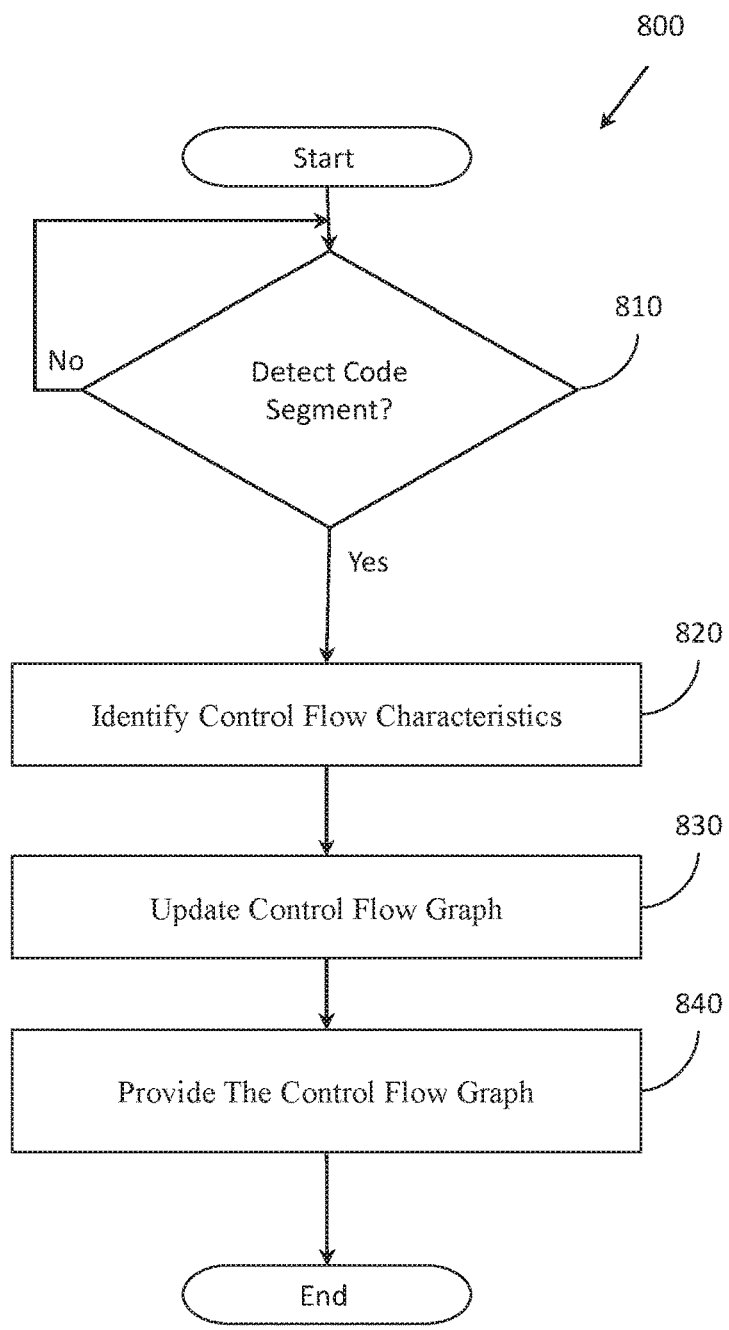
FIG. 8 illustrates one embodiment of a method associated with generating a control flow graph in real-time.

Additional aspects of generating control flow graphs and providing further functionality therefrom will be discussed in relation to FIG. 8. FIG. 8 illustrates a method 800 associated with generating control flow graphs in real-time. Method 800 will be discussed from the perspective of the data control system 100 of FIG. 1. While method 800 is discussed in combination with the data control system 100, it should be appreciated that the method 800 is not limited to being implemented within the data control system 100 but is instead one example of a system that may implement the method 800.

At 810, the analysis module 130 monitors for and periodically detects a code segment being added to the source code of the program. It should be noted, that as used herein, adding a code segment at 810 generally refers to adding new code segments, and also modifying existing code segments within the source code of the program. More generally, the analysis module 130 monitors an electronic input stream into an integrated development environment (IDE) within a computing device for inputs (e.g., code, commands, etc.) that involve changes to the source code. Accordingly, the analysis module 130, in one embodiment, continuously monitors the input stream into the IDE through, for example, an API to identify when the source code is being modified (i.e., added to or changed). Consequently, upon detecting the noted modification, the analysis module 130 proceeds to identify control flow characteristics at block 820.

At 820, the analysis module 130 identifies the control flow characteristics of the graph 170. In one embodiment, the analysis module 130 analyzes the source code using a depth-first search to traverse statements within the source code. In further aspects, the analysis module 130 implements other suitable approaches to traversing the source code and identifying the characteristics as may be appreciated. When the analysis module 130 is traversing the source code, the module 130 is parsing statements within the source code to identify at least function calls, function return addresses, function arguments, function return values, and relationships between the statements as the control flow characteristics.

In various implementations, the analysis module 130 analyzes effected portions of the source code associated with the detected code segment/changes from 810, while in further aspects, the analysis module 130 re-analyzes the source code overall to identify the control flow characteristics in response to a change. In general, the approach that is undertaken is related to an overall size of the source code, a size of the modification, and available resources for performing the analysis. Thus, in one embodiment, the analysis module 130 selectively undertakes a partial or full review to determine the control flow characteristics according to an indicated preference. Whichever approach is performed by the analysis module 130, the control flow characteristics provide information about intra-procedural and/or inter-procedural control flow transfers of the program that are to be represented in the graph 170.

Additionally, the analysis module 130, in one embodiment, further identifies which statements of the source code include vulnerabilities by comparing the control flow characteristics with a graph policy. In one embodiment, the graph policy defines conditions indicative of security vulnerabilities and performance bottlenecks. Accordingly, the additional information about vulnerabilities and bottlenecks can also be included within the control flow characteristics such that the information is subsequently integrated with the graph 170 to provide further indications about characteristics of different portions of the source code. Moreover, in various approaches, the analysis module 130 uses further information specified by the graph policy to identify the vulnerabilities and bottlenecks. Thus, the graph policy may further specify conditions in the program associated with data flow, control data arguments, data exposure, and program flow that correlate with the vulnerabilities. In either case, the analysis module 130 can include aspects that are both directly and indirectly related to the program flow within the control flow characteristics for inclusion in the graph 170.

At 830, the graph module 140 updates the control flow graph 170. In one embodiment, the graph module 140 uses the control flow characteristics identified at 820 in order to form nodes and directed edges of the graph 170. Consider that the control flow graph generally represents execution paths through the program, and thus the graph module 140 uses the control flow characteristics to identify the paths (e.g., directed edges) between different code segments (e.g., nodes) from which the graph 170 is formed. Thus, the graph module 140 updates the control flow graph 170 by adding the control flow characteristics corresponding to the detected code segment while modifying existing nodes and edges of the control flow graph to accommodate the code segment. That is, for example, existing directed edges may be re-routed while additional nodes are added, existing nodes may be modified, indicated conditions can be modified or new conditions added, and so on.

Additionally, as previously noted, the graph module 140 functions in real-time as the code segment is being added to the source code to update the graph 170. As such, the graph module 140 maintains the graph 170 in an updated form so that reference may be made directly to the graph 170 in order to facilitate the development of the program.

Moreover, the graph module 140 also updates the graph 170 with the additional characteristics as previously described. That is, the graph module 140 tags or otherwise provides annotations in the graph 170 about vulnerabilities of code segments associated with nodes, bottlenecks associated with various nodes, and other notable characteristics. Accordingly, not only does the graph module 140 actively develop the graph 170 as the source code is being written but the graph module 140 also provides additional information about the code segments within a data structure of the corresponding nodes in order to facilitate mitigation of the vulnerabilities and bottlenecks by, for example, highlighting the particular characteristics.

At 840, the graph module 140 provides the control flow graph 170 to improve the functioning of the program by facilitating adjustments in the source code. As previously explained, the control flow graph 170 provides a representation of how execution of the program will progress and thus provides insights about the source code that are generally otherwise not identifiable. As such, various systems can leverage the graph 170 to manipulate the source code and/or provide further functionality to developers.

As one aspect of providing the control flow graph 170 at 840, the graph module 140 generates a visual representation of the control flow graph and dynamically displays the visual representation within an integrated development environment (IDE) as the code segment is generated to provide a real-time representation of the program. The visual representation is provided as an interactive graphic that includes the nodes, directed edges, and other symbolic representations of the source code in a fashion that is similar to, for example, the graphs of FIGS. 3-5.

Figure 9:
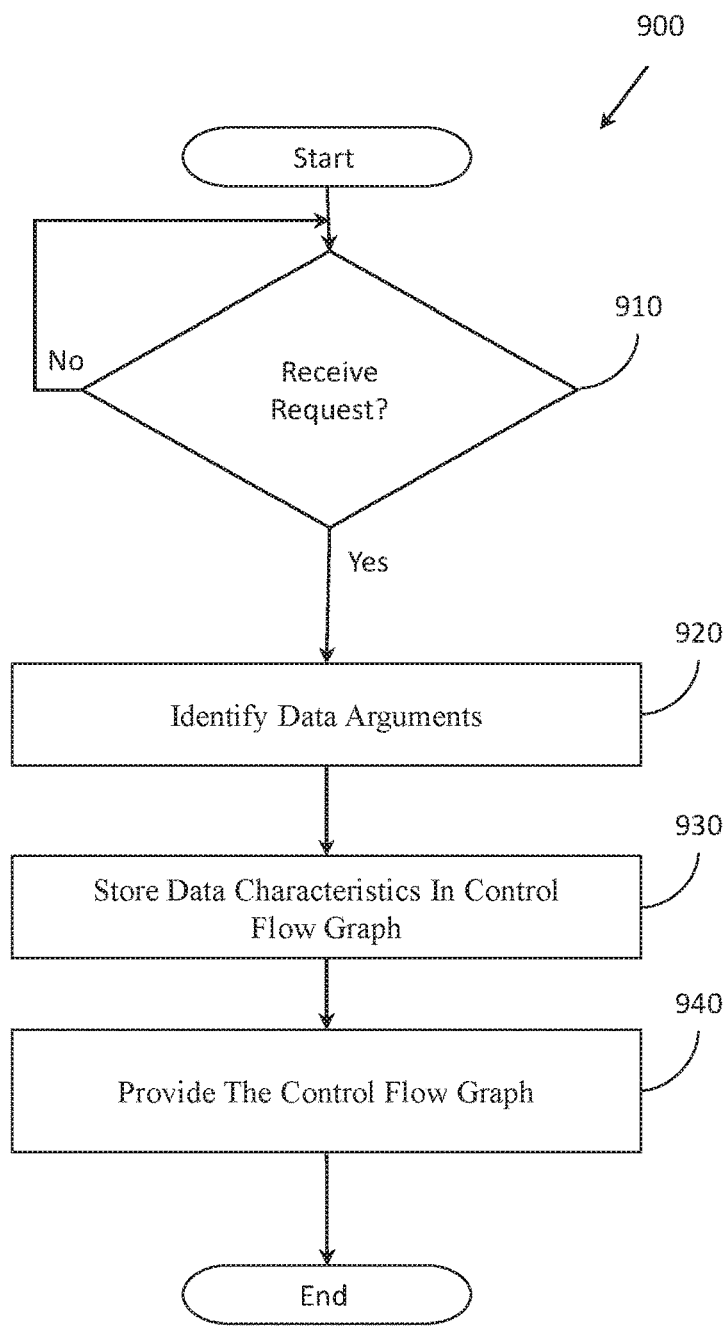
FIG. 9 illustrates one embodiment of a method associated with identifying data arguments and integrating the data arguments within a control flow graph.

Additional aspects of generating control flow graphs, and, in particular, identifying non-control data arguments will be discussed in relation to FIG. 9. FIG. 9 illustrates a method 900 associated with validating data arguments by integrating data characteristics of non-control data arguments into a control flow graph. Method 900 will be discussed from the perspective of the data control system 100 of FIG. 1. While method 900 is discussed in combination with the data control system 100, it should be appreciated that the method 900 is not limited to being implemented within the data control system 100 but is instead one example of a system that may implement the method 900. Moreover, while method 900 is generally discussed in isolation from method 800, it should be appreciated that both method 800 and method 900, in one approach, execute in parallel to populate the control flow graph 170 with relevant information that is subsequently employed by the instrumentation module 150 and/or other systems to facilitate additional functionality.

At 910, the analysis module 130 monitors for a request. In one embodiment, the request is an electronic request that is generated upon a code segment being added to the source code. As noted in relation to the method 800, as used herein, adding a code segment at 910 generally refers to adding new code segments, and also modifying existing code segments within the source code of the program. More generally, the analysis module 130 monitors an electronic input stream into an integrated development environment (IDE) within a computing device for inputs (e.g., code, commands, etc.) that involve changes to the source code. In one approach, the analysis module 130 continuously monitors the input stream into the IDE through, for example, an API to identify when the source code is being modified (i.e., added to or changed). As such, the analysis module 130 may implement the functions discussed at blocks 810 and 910 as a single check that is monitoring processes implemented to identify when information is available within the source code to analyze. Consequently, upon detecting the noted modification, the analysis module 130 proceeds to identify data characteristics at block 920.

At 920, the analysis module 130 identifies one or more data arguments within the code segment. In one embodiment, the identification of non-control data arguments at block 920 occurs in parallel with the identification of control flow characteristics at block 820 of method 800. The analysis module 130 identifies the data arguments according to, for example, indicators specified by the graph policy such as data types and associations of the data types that define whether the data argument is a control or non-control data argument.

In either case, the analysis module 130 parses the source code at the code segment to identify the data argument(s) and harvest therefrom the data characteristics. In one embodiment, the data characteristics indicate a state of the data argument at various points in the control flow graph and at least one relationship associated with the data argument (e.g., functions to which the data argument is passed). Furthermore, the state indicates a type of access or use that can include at least one of set/initiated, used, and modified to identify permissible interactions with the data argument.

In various implementations, the analysis module 130 analyzes effected portions of the source code associated with the detected code segment/changes from 910, while in further aspects, the analysis module 130 re-analyzes the source code overall to identify the control flow characteristics in response to a change. In general, the approach that is undertaken is related to an overall size of the source code, a size of the modification, and available resources for performing the analysis. Thus, in one embodiment, the analysis module 130 selectively undertakes a partial or full review to determine the control flow characteristics according to an indicated preference. Whichever approach is performed by the analysis module 130, the data characteristics provide information about data flow of the program that is to be represented in the graph 170.

Additionally, the analysis module 130, in one embodiment, further identifies which statements of the source code include vulnerabilities by comparing the data characteristics with a graph policy. In one embodiment, the graph policy defines conditions indicative of security vulnerabilities that relate to particular aspects of data handled within the program. Accordingly, the additional information about vulnerabilities can also be included within the data characteristics that are included in the graph 170 such that the information is subsequently integrated with the graph 170 to provide further indications about characteristics of different portions of the source code.

At 930, the graph module 140 stores the data characteristics of the identified data argument(s) in the control flow graph 170. In one embodiment, the graph module 140 uses the data characteristics identified at 920 in order to integrate information about the data argument(s) into nodes of the graph 170. As with block 920, the functions discussed with block 930 may occur in parallel with method 800, and, in particular, in parallel with functions discussed along with block 830 of method 800.

Thus, the graph module 140 updates the control flow graph 170 according to detected data arguments by storing the data characteristics corresponding to the detected code segment into relevant nodes of the graph 170 where states associated with the data argument(s) indicate various accesses to the data argument. That is, for example, nodes of the graph 170 are annotated/tagged with the data characteristics such that at least a portion of the data characteristics for a given data argument are stored within a respective node of the graph 170. As such, for a node representing a particular code block and related to a data argument according to a data access or passing the data between functions, the graph module 140 adds relevant annotations into the node to indicate the relationship and characteristics of the access.

Moreover, the graph module 140 also updates the graph 170 with the additional characteristics as previously described. That is, the graph module 140 tags or otherwise provides annotations in the graph 170 about vulnerabilities of particular data arguments to ensure, for example, instrumentation of the noted non-control data arguments. Accordingly, not only does the graph module 140 actively develop the graph 170 but the graph module 140 also provides additional information about the code segments within a data structure of the corresponding nodes to facilitate mitigation of the vulnerabilities.

At 940, the graph module 140 provides the control flow graph 170 as an electronic output. As previously explained, the control flow graph 170 provides a representation of how execution of the program will progress along with characterizations as to the use of data arguments at various steps in the execution. Thus, the graph 170 provides insights about the source code that are generally otherwise not identifiable. As such, various systems can leverage the graph 170 to manipulate the source code and/or provide further functionality.

As one aspect of providing the control flow graph 170 at 940, the graph module 140 electronically communicates the graph 170 to the instrumentation module 150 so that segments of the source code identified in the control flow graph 170 can be instrumented to ensure both data integrity for the non-control data arguments and control flow integrity for the control data arguments.

Figure 10:
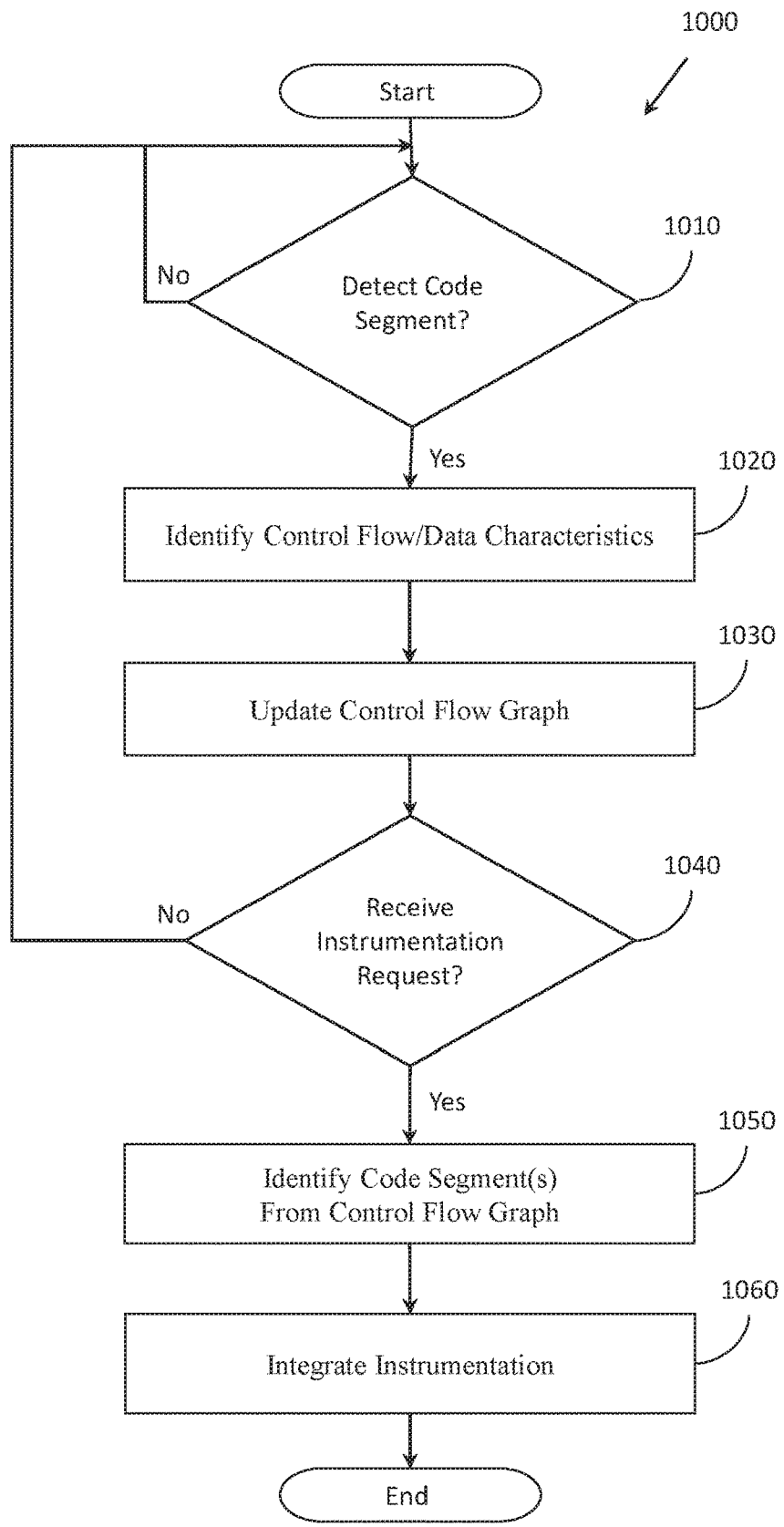
FIG. 10 illustrates one embodiment of a method associated with automatically instrumenting source code.

FIG. 10 illustrates a method 1000 associated with automatically instrumenting source code of a program. In a similar fashion as discussed in relation to FIGS. 8-9, method 1000 will be discussed from the perspective of the data control system 100 of FIG. 1. While method 1000 is discussed in combination with the data control system 100, it should be appreciated that the method 1000 is not limited to being implemented within the data control system 100 but is instead one example of a system that may implement the method 1000.

As an initial note, method 1000 is illustrated as including blocks 1010, 1020, and 1030, which should generally be understood to correlate with blocks 810, 820, 830, and 910, 920, and 930 executing in parallel. For example, block 1010 is representative of functions associated with blocks 810 and 910 executing in parallel. Furthermore, block 1020 is representative of blocks 820 and 920 executing in parallel, and block 1030 is representative of blocks 830 and 930 executing in parallel. As such, the discussion of the noted blocks will not be reiterated but should instead be understood to comprise a parallel execution of aspects from both method 800 and method 900. Additionally, it should be appreciated that the graph 170 is generally provided into the method 1000 at block 1040 as an electronic output of functionality from blocks 1010-1030.

At 1040, the instrumentation module 150 monitors for and detects a request to instrument the source code. In various embodiments, the request may take different forms. For example, in one approach, the request is coincident with modifications to the source code for which the graph 170 is also modified. That is, when the graph 170 is updated according to modifications to the source code, the instrumentation module 150 also functions to instrument the source code in real-time for the modifications.

Alternatively, the instrumentation request is generated by the system 100 once the source code is completed or, in a further aspect, when the source code is to be compiled into the program. Accordingly, the request to instrument the source code is, in one embodiment, generated by the system 100 in response to a request to compile the source code generated within the IDE, and is acted upon prior to the compiling. Thus, the instrumentation module 150 functions in real-time to instrument the source code as the source code is modified or once the source code is ready to be compiled.

At 1050, the instrumentation module 150 identifies code segments of the source code that are to be instrumented. In one embodiment, the instrumentation module 150 identifies the code segments according to existing tags placed on the segments in the source code, according to labeled characteristics in the graph 170 associated with the code segments, according to identified control flows represented in the graph 170, according to identified non-control data arguments in the graph 170, and/or according to further metrics/characteristics as defined by the instrumentation policy 180. In general, the instrumentation module 150 is instrumenting the source code to ensure the program flow integrity and data integrity during execution. Thus, the instrumentation module 150 identifies code segments that are involved in directly or indirectly transferring control between functions, adjusting program flow addresses, manipulating data arguments, and other such code segments. In general, the noted code segments are associated with the nodes and the directed edges within the graph 170 or conditions associated with transfers embodied by the directed edges.

Accordingly, in further aspects, the instrumentation module 150 analyzes the source code according to the control flow graph 170. The instrumentation module 150 also, in one or more embodiments, may analyze the individual code segments in order to determine whether the code segments satisfy the instrumentation policy 180 as implemented for including instrumentation. That is, various conditions such as thresholds according to importance level, security level, etc. can be identified for determining when to include instrumentation within a function. In this way, the instrumentation can be included in an intelligent manner so as to consider the performance and security of the program and to avoid unnecessarily including instrumentation when possibly not needed.

In either case, because not all code segments/functions within the source code are to be instrumented, the check at 1050 may include assessing whether the code segment is to be instrumented. That is, for example, the instrumentation module 150 assesses the characteristics of the newly added/adjusted code segment to determine whether the code segment is to include instrumentation. If the instrumentation module 150 determines the code segment is to be instrumented, then the instrumentation module 150 continues to integrate the instrumentation as discussed at block 1060. Otherwise, the instrumentation module 150 may exit if only a modified segment is being considered or no other segments overall are being considered.

At 1060, the instrumentation module 150 integrates instrumentation within the source code. As previously noted, in one embodiment, the instrumentation module 150 includes the instrumentation according to both control data arguments and non-control data arguments in the control flow graph 170 to enforce runtime checks within the program that improve the security of the program. That is, the instrumentation that is added to the source code ensures the program cannot be directed outside of the paths represented by the graph 170 and also ensures that data (i.e., variables) cannot be maliciously modified outside of identified permissible uses/modifications identified from the source code.

Moreover, the process of integrating the instrumentation includes, in one embodiment, the instrumentation module 150 automatically adding the instrumentation according to the identified segments by modifying templates of defined instrumentation according to the source code. As previously explained, the instrumentation module 150 adjusts variable aspects of the templates to conform to a code segment with which the instrumentation is being integrated. Accordingly, the instrumentation module 150 customizes the included instrumentation to achieve the particular functionality while also using instrumentation that is, for example, pre-approved and generally known to function correctly. In this way, the instrumentation module 150 uses the graph 170 to provide additional functionality that ultimately improves the resulting program through both data runtime checks and control runtime checks implemented via the instrumentation. In this way, the resulting program is improved through better instrumentation that ensures the security of the program from malicious attacks.

Additionally, it should be appreciated that the data control system 100 from FIG. 1 can be configured in various arrangements with separate integrated circuits and/or chips. In such embodiments, the analysis module 130 from FIG. 1 is embodied as a separate integrated circuit. Additionally, the graph module 140 is embodied on an individual integrated circuit. Moreover, the instrumentation module 150 is embodied on a separate integrated circuit. The circuits are connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits. In another embodiment, the modules 130, 140, and 150 may be combined into a separate application-specific integrated circuit. In further embodiments, portions of the functionality associated with the modules 130, 140, and 150 may be embodied as firmware executable by a processor and stored in a non-transitory memory. In still further embodiments, the modules 130, 140, and 150 are integrated as hardware components of the processor 110.

In another embodiment, the described methods and/or their equivalents may be implemented with computer-executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The data control system 100 can include one or more processors 110. In one or more arrangements, the processor(s) 110 can be a main processor of the data control system 100. For instance, the processor(s) 110 can be an electronic control unit (ECU). The data control system 100 can include one or more data stores for storing one or more types of data. The data stores can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, distributed memories, cloud-based memories, other storage medium that are suitable for storing the disclosed data, or any combination thereof. The data stores can be a component of the processor(s) 110, or the data store can be operatively connected to the processor(s) 110 for use thereby. The term "operatively connected," as used throughout this description, can include direct or indirect connections, including connections without direct physical contact.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-10, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term, and that may be used for various implementations. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A data control system for validating data arguments in a program, comprising:
   one or more processors;
   a memory communicably coupled to the one or more processors and storing:
   an analysis module including instructions that when executed by the one or more processors cause the one or more processors to, in response to an electronic request, identify a data argument within a code segment of source code of the program, wherein the data argument is non-control data passed between one or more functions of the program;
   a graph module including instructions that when executed by the one or more processors cause the one or more processors to store data characteristics about the data argument within a control flow graph derived from the source code, wherein the control flow graph represents execution paths within the program, and wherein the data characteristics indicate a state of the data argument and at least one relationship associated with the data argument, and
   wherein the graph module includes instructions to provide the control flow graph as an electronic output to facilitate adjustments in the source code; and
   an instrumentation module including instructions that when executed by the one or more processors cause the one or more processors to integrate instrumentation within the source code including instructions to i) identify segments of the source code that are to be instrumented according to control arguments and the data arguments identified in the control flow graph and ii) automatically add the instrumentation according to the identified segments.

2. The data control system of claim 1, wherein the graph module further includes instructions to generate the control flow graph according to control flow characteristics of the source code in-parallel with identifying the data argument,
   wherein the analysis module includes instructions to identify the data argument in response to the electronic request including instructions to receive the electronic request upon the code segment being added to the source code, and wherein the electronic request is generated in response to detecting addition of the code segment to the source code.

3. The data control system of claim 1, wherein the control flow graph is comprised of nodes representing blocks of the source code and directed edges between the nodes representing transitions between the blocks, and
   wherein the graph module includes instructions to store the data characteristics in the control flow graph including instructions to integrate the data characteristics at associated nodes within the control flow graph where the data argument is accessed or passed between functions.

4. The data control system of claim 1, wherein the analysis module includes instructions to identify the data characteristics including instructions to determine a state of the data argument in the control flow graph at separate points where the data argument is at least one of set, used, and modified to identify permissible interactions with the data argument, and wherein the data argument is a variable defined within the source code.

5. The data control system of claim 2, wherein the graph module includes instructions to generate the control flow graph including instructions to incrementally update the control flow graph by adding control flow characteristics corresponding to the code segment to the control flow graph upon the code segment being added to the source code.

6. The data control system of claim 5, wherein the analysis module includes instructions to identify the control flow characteristics and the data characteristics of the source code simultaneously according to a graph policy that defines conditions indicative of vulnerabilities in the source code associated with data flow, data exposure, and program flow for control data and non-control data.

7. The data control system of claim 1,
wherein the instrumentation module includes the instructions to instrument the source code including instructions to, responsive to a request to instrument the program, integrate the instrumentation within the source code according to the control flow graph to ensure data flow integrity through data runtime checks for the data argument and ensure program flow integrity through control runtime checks for control flow characteristics of the program,
wherein the data runtime checks monitor interactions with the data argument to permit identified permissible interactions while rejecting impermissible interactions.

8. The data control system of claim 7, wherein the instrumentation module includes instruction to automatically add the instrumentation according to the identified segments including instructions to modify templates of defined instrumentation that provide the data runtime checks and the control runtime checks according to the control flow graph.

9. A non-transitory computer-readable medium storing instructions for validating data arguments in a program and that when executed by one or more processors cause the one or more processors to:
in response to an electronic request, identify a data argument within a code segment of source code of the program, wherein the data argument is non-control data passed between one or more functions of the program;
store data characteristics about the data argument within a control flow graph derived from the source code, wherein the control flow graph represents execution paths within the program, and wherein the data characteristics indicate a state of the data argument and at least one relationship associated with the data argument;
provide the control flow graph as an electronic output to facilitate adjustments in the source code; and
integrate instrumentation within the source code including instructions to i) identify segments of the source code that are to be instrumented according to control arguments and the data arguments identified in the control flow graph and ii) automatically add the instrumentation according to the identified segments.

10. The non-transitory computer-readable medium of claim 9, wherein the instructions include instructions to generate the control flow graph according to control flow characteristics of the source code in-parallel with identifying the data argument,
wherein the instructions to identify the data argument in response to the electronic request include instructions to receive the electronic request upon the code segment being added to the source code, and wherein the electronic request is generated in response to detecting addition of the code segment to the source code.

11. The non-transitory computer-readable medium of claim 9, wherein the control flow graph is comprised of nodes representing blocks of the source code and directed edges between the nodes representing transitions between the blocks, and
wherein the instructions to store the data characteristics in the control flow graph include instructions to integrate the data characteristics at associated nodes within the control flow graph where the data argument is accessed or passed between functions.

12. The non-transitory computer-readable medium of claim 9, wherein the instructions to identify the data characteristics include instructions to determine a state of the data argument in the control flow graph at separate points where the data argument is at least one of set, used, and modified to identify permissible interactions with the data argument, and wherein the data argument is a variable defined within the source code.

13. The non-transitory computer-readable medium of claim 9, further comprising instructions to:
responsive to a request to instrument the program, integrate instrumentation within the source code according to the control flow graph to ensure data flow integrity through data runtime checks for the data argument and ensure program flow integrity through control runtime checks for control flow characteristics of the program,
wherein the data runtime checks monitor interactions with the data argument to permit identified permissible interactions while rejecting impermissible interactions.

14. A method of validating data arguments in a program, comprising:
in response to an electronic request, identifying a data argument within a code segment of source code of the program, wherein the data argument is non-control data passed between one or more functions of the program;
storing data characteristics about the data argument within a control flow graph derived from the source code, wherein the control flow graph represents execution paths within the program, and wherein the data characteristics indicate a state of the data argument and at least one relationship associated with the data argument;
providing the control flow graph as an electronic output to facilitate adjustments in the source code; and
integrating instrumentation within the source code by i) identifying segments of the source code that are to be instrumented according to control arguments and the data arguments identified in the control flow graph and ii) automatically adding the instrumentation according to the identified segments.

15. The method of claim 14, further comprising:
generating the control flow graph according to control flow characteristics of the source code in-parallel with identifying the data argument,
wherein identifying the data argument in response to the electronic request includes receiving the electronic request upon the code segment being added to the source code, and wherein the electronic request is generated in response to detecting addition of the code segment to the source code.

16. The method of claim 14, wherein the control flow graph is comprised of nodes representing blocks of the source code and directed edges between the nodes representing transitions between the blocks, and wherein storing the data characteristics in the control flow graph includes integrating the data characteristics at associated nodes within the control flow graph where the data argument is accessed or passed between functions.

17. The method of claim 14, wherein identifying the data characteristics includes determining a state of the data argument in the control flow graph at separate points where the data argument is at least one of set, used, and modified to identify permissible interactions with the data argument, and wherein the data argument is a variable defined within the source code.

18. The method of claim 15, wherein generating the control flow graph includes incrementally updating the control flow graph by adding control flow characteristics corresponding to the code segment to the control flow graph,
wherein generating the control flow graph includes identifying the control flow characteristics and the data characteristics of the source code simultaneously according to a graph policy that defines conditions indicative of vulnerabilities in the source code associated with data flow, data exposure, and program flow for control data and non-control data.

19. The method of claim 14,
wherein, integrating instrumentation within the source code includes responsively instrumenting the source code according to request and the control flow graph to ensure data flow integrity through data runtime checks for the data argument and ensure program flow integrity through control runtime checks for control flow characteristics of the program,
wherein the data runtime checks monitor interactions with the data argument to permit identified permissible interactions while rejecting impermissible interactions.

20. The method of claim 18, wherein automatically adding the instrumentation includes modifying templates of defined instrumentation that provide the data runtime checks and the control runtime checks according to the control flow graph.

* * * * *